S. J. CLULEE.
EYEGLASSES OR SPECTACLES.
APPLICATION FILED MAY 8, 1916.

1,248,430.

Patented Nov. 27, 1917.

Inventor.
Stephen J. Clulee
By Horatio E. Bellows.
Attorney

UNITED STATES PATENT OFFICE.

STEPHEN J. CLULEE, OF ATTLEBORO, MASSACHUSETTS

EYEGLASSES OR SPECTACLES 1,248,430.  Specification of Letters Patent.  Patented Nov. 27, 1917.

Application filed May 8, 1916. Serial No. 96,009.

*To all whom it may concern:*

Be it known that I, STEPHEN J. CLULEE, a citizen of the United States, residing at Attleboro, in the county of Bristol and State of Massachusetts, have invented certain new and useful Improvements in Eyeglasses or Spectacles, of which the following is a specification.

My invention relates to eyeglasses and spectacles and particularly to the mountings or attaching parts used in conjunction with lens bows of celluloid, shell, xylonite, and like substances having a high coefficient of expansion and contraction, but of a frangible character.

The essential objects of my invention are to insure at all times and under all temperatures a firm grip or interengagement of the rims and the mountings or attachments thereof; to adapt the mounting to non-metallic spring rims in a manner to accommodate the structure to lenses of varying sizes and without reshaping the rims; and to attain these results in an inexpensive structure.

To these ends essentially my invention consists in such parts and combinations of parts as fall within the scope of the appended claims.

Figure 1:
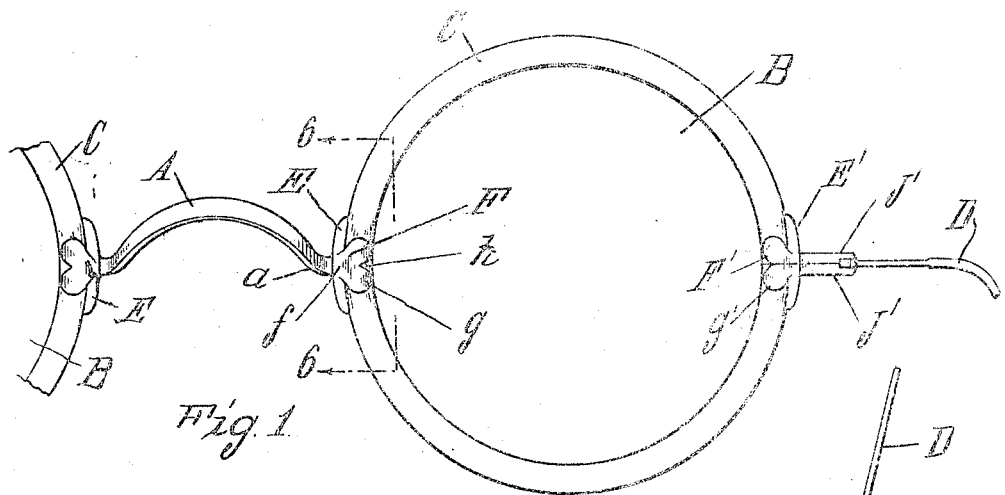
Figure 2:
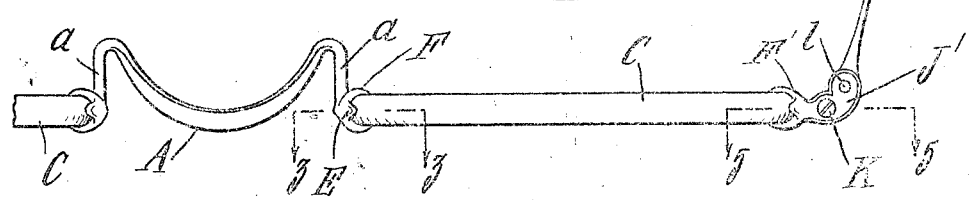
Figures 3, 4, 5:
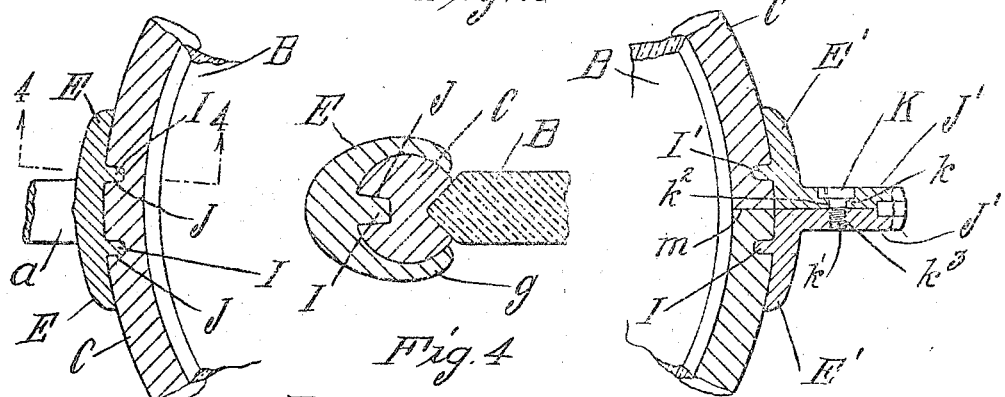
Figure 6:
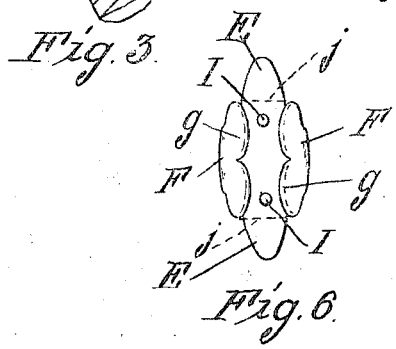

In the accompanying drawings which form a part of this specification,

Figure 1 is a front elevation of a portion of a pair of spectacles embodying my invention, Fig. 2, a plan of the same, Fig. 3, a section on line 3—3 of Fig. 2, Fig. 4, a section on line 4—4 of Fig. 3, Fig. 5, a section on line 5—5 of Fig. 2, and Fig. 6, a view of the interior of an attachment viewed on line 6—6 of Fig. 1.

Like reference characters indicate like parts throughout the views.

In the embodiment of my invention herein shown A is the bridge, B the lens, and C the rim of a pair of eyeglasses or spectacles, all of the usual construction including the temple D herein shown broken away.

Upon the supports $a$ integral with the bridge are the usual bearings or shoes E integral with the sides of which are transversely curved ears F, each provided preferably with a comparatively narrow inclined base portion $f$ and a broad outer portion $g$, bifurcated as at $h$.

Spaced from each other upon the inner face of the shoe are preferably integral pins I in vertical alinement with each other and located within the horizontal planes of the ends of the portions $g$ of the ears F, as best shown in Fig. 6 wherein the horizontal planes of the ears is indicated by the broken lines $j$. The pins enter cavities J in the rim, and the strap rests against the rim.

Attachment for the temple, when a temple is employed, is similar to that described except that it is transversely separated at its middle portion, and corresponding parts are indicated by prime numbers.

The end pieces J', therefore, have the supports $a$ with bearings or shoes E' abutting against each other, and pins I' in vertical alinement with each other, and within the horizontal planes of the ends $g'$ of the ears F'.

The end pieces are connected by a screw K having an intermediate shoulder $k$, and a threaded shank $k'$ located in alined openings $k^2$ and $k^3$ in the end pieces; and the temple D is pivoted on the pin $l$.

It will be noted that the location of the pins I and I' is remote from the ends of the shoes E, and within the transverse plane of the ears, develops a coöperation of the parts that maintains the rim C in a permanent grip that cannot be loosened. If expansion occurs sufficient to occasion slight looseness of the pins in their seats in the rim, yet the curvature of the ears F retains the rim.

It will be further observed that by reason of the split or seam $m$ in the non-metallic bow or rim C, and the separate character of the members J and their supporting parts it is possible to insert lenses of varying sizes or diameters in the rims and still insure a tight engagement thereof by tightening or loosening the screw.

What I claim is:—

1. The combination with a non-metallic rim provided with cavities, of a shoe resting against the rim, lateral curved ears on the shoe embracing the rim, and pins in an intermediate portion of the shoe and inclosed by the ears seated in the cavities.

2. The combination with the lens, of a transversely split non-metallic rim embracing the lens and provided with cavities in adjacent margins of the split portions, end pieces, a clamping screw connecting the end pieces, shoes on the ends of the end pieces resting against the margins of the split portions of the rim, lateral ears upon the shoes embracing said rim, and pins in the shoes seated in the cavities and inclosed by the ears.

3. The combination with the lens, of a transversely split non-metallic rim embracing the lens and provided with cavities in adjacent margins of the split portions, end pieces, a clamping screw connecting the end pieces, shoes on the ends of the pieces engaging the rim, transversely curved lateral ears on the shoes embracing said rim, and pins in intermediate portions of the shoe and inclosed by the ears seated in the cavities.

In testimony whereof I have affixed my signature.

STEPHEN J. CLULEE.